United States Patent [19]

Fritz

[11] Patent Number: 5,234,163

[45] Date of Patent: Aug. 10, 1993

[54] POWER COST SAVING IRRIGATION METHOD AND APPARATUS

[76] Inventor: David H. Fritz, 28603 Bushnell Rd., Burlington, Wis. 53105

[21] Appl. No.: 852,326

[22] Filed: Mar. 18, 1992

[51] Int. Cl.$^5$ .................... B05B 12/02; B05B 12/14; B05B 9/03
[52] U.S. Cl. .................... 239/70; 239/200; 239/201; 137/599
[58] Field of Search .................... 239/1, 67, 70, 101, 239/200, 201, 302, 332, 310; 137/599, 624.13, 624.15

[56] References Cited

U.S. PATENT DOCUMENTS

| | | | |
|---|---|---|---|
| 1,058,464 | 4/1913 | Pritchard | 239/200 |
| 4,161,186 | 7/1979 | Sitarz | 239/201 X |
| 4,708,162 | 11/1987 | Bayat | 239/70 X |
| 4,934,404 | 6/1990 | DeStefano | 239/310 X |
| 5,060,859 | 10/1991 | Bancroft | 239/70 X |

FOREIGN PATENT DOCUMENTS 0718058 2/1980 U.S.S.R. .................... 239/201

Primary Examiner—Andres Kashnikow
Assistant Examiner—William Grant
Attorney, Agent, or Firm—Trexler, Bushnell, Giangiorgi & Blackstone, Ltd.

[57] ABSTRACT

An irrigation system for irrigating an area comprises a pipe for delivering water to the area to be irrigated, and a pump connected to the pipe for delivering a first water supply to the pipe. A timer is operatively associated with the pump for activating the pump during a first predetermined time period. A second water supply is provided connectable to the pipe during a second predetermined time period when the pump is deactivated. A method for irrigating an area is also provided comprising the steps of: providing a water delivering pipe associated with the area for irrigating the area; delivering a first water supply to the pipe during a first predetermined time period; preventing delivery of the first water supply to the pipe during a second predetermined time period; and delivering a second water supply to the pipe during a second predetermined time period.

7 Claims, 1 Drawing Sheet

POWER COST SAVING IRRIGATION METHOD AND APPARATUS

BACKGROUND AND SUMMARY OF THE INVENTION

The present invention generally relates to a novel construction of an irrigation system and a method. More specifically, the invention relates to a novel irrigation apparatus and a method which saves power costs related to irrigation.

Irrigation apparatuses and systems are used quite frequently in the modern world. Irrigation systems and apparatuses can be found on farms, nurseries, parks, sport playing fields, and even around some family homes. One popular utilization of irrigation apparatuses is on a golf course. Golf courses often have irrigation apparatuses for keeping the grass on the tee, fairway and green in appropriate condition for the game of golf. If these grasses are not kept in proper condition, the course may become undesirable to play, thereby resulting in lost revenues to the course owner. Especially, courses played by professional golfers during tournaments must be kept lush and green to present a pleasing image and a desirably playable surface to the professionals and the spectators alike. Again, if this is not done, the course owner may lose revenues.

Accordingly, the irrigation systems must operate long enough to maintain the course in proper condition. Similar considerations govern the operation of irrigation systems employed in other environments. Because the irrigation apparatuses must operate for long periods of time, depending on the ambient weather conditions, especially during summers and dry seasons, the operation of these systems represents a significant expenditure to the operators thereof.

The irrigation systems and apparatuses usually include numerous sprinkler heads which are supplied with water, usually under a pressure of 100 psi or more, from a pumping station. The high pressures are necessary to propel the water from the sprinkler heads over the entire area intended to be serviced by the heads. The sprinkler heads may be turned on selectively, either automatically, manually, directly, or remotely, for providing water to those areas or portions of the course which require water at any given time. Therefore, the amount of water required by the particular irrigation apparatus or system varies according to the number of sprinkler heads turned on at a particular time.

The pumping station draws water from a reservoir, preferably on site, such as a pond, pressurizes the water, and delivers the pressurized water to the heads. The reservoir is usually kept full by a water feed from a well or a municipal or local utility water supply. To perform its functions, the pumping station includes one or more pumps for drawing water from the reservoir, and for supplying the pressurized water to the sprinkler heads, and/or one or more electric motors for driving the pumps.

Because the motors are electric, the operation costs thereof often vary depending on the time of day during which the motors operate. This cost variation arises because electric utility companies, which supply the requisite electrical power to the motors, often charge higher rates for power during "peak" periods and lower rates during "off-peak" periods, such as at night.

Because it is less expensive to operate the electric motors, and thus the pumps, golf course owners desire to do major watering of their courses during the off-peak periods in a effort to save money. However, the ambient weather conditions often do not cooperate. During hot, dry weather conditions, such as those during the summer, it is often necessary to water the course, or at least portions thereof during peak periods in order to preserve the course in appropriate condition for play, as discussed hereinabove. During extended hot and dry weather, these necessary waterings can become quite expensive, thereby reducing the course owner's revenues.

The present invention is intended to solve some, if not all, of the above-discussed irrigation problems. Utilization of the irrigation apparatus and method of the invention can provide a golf course, or other land portion, with adequate water at all times while simultaneously reducing or minimizing expenditures related to irrigation.

OBJECTS AND SUMMARY OF THE INVENTION

A general object of the present invention is to provide a novel irrigation system.

A more specific object of the invention is to provide an irrigation system and method which can provide cost savings to an operator.

Another object of the present invention is to provide an irrigation system and method having particular utility with irrigating a golf course.

An additional object of the invention is to provide an irrigation system and method which utilizes least expensive water sources at all times.

A further object of the present invention is to provide an irrigation system and method which supplies relatively smaller amounts of water during energy peak periods and relatively larger amounts of water during energy off-peak periods.

Yet another object of the invention is to provide a novel irrigation system which can be installed in existing irrigation systems.

An additional object of the present invention is to provide a novel irrigation system which can provide water continuously.

An irrigation system, constructed according to the teachings of the present invention, for supplying water to an area, comprises a pipe for delivering water to the area to be irrigated, and a pump connected to the pipe for delivering a first water supply to the pipe. A timer is operatively associated with the pump for activating said pump during a first predetermined time period. A second water supply is provided connectable to the pipe during a second predetermined time period when the pump is deactivated.

A method for irrigating an area is also provided comprising the steps of: providing a water delivering pipe associated with the area for irrigating the area; delivering a first water supply to the pipe during a first predetermined time period; preventing delivery of the first water supply to the pipe during a second predetermined time period; and delivering an second water source to the pipe during a second predetermined time period.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which.

DETAILED DESCRIPTION OF THE PREFERRED EMBODIMENT

Figure 1:
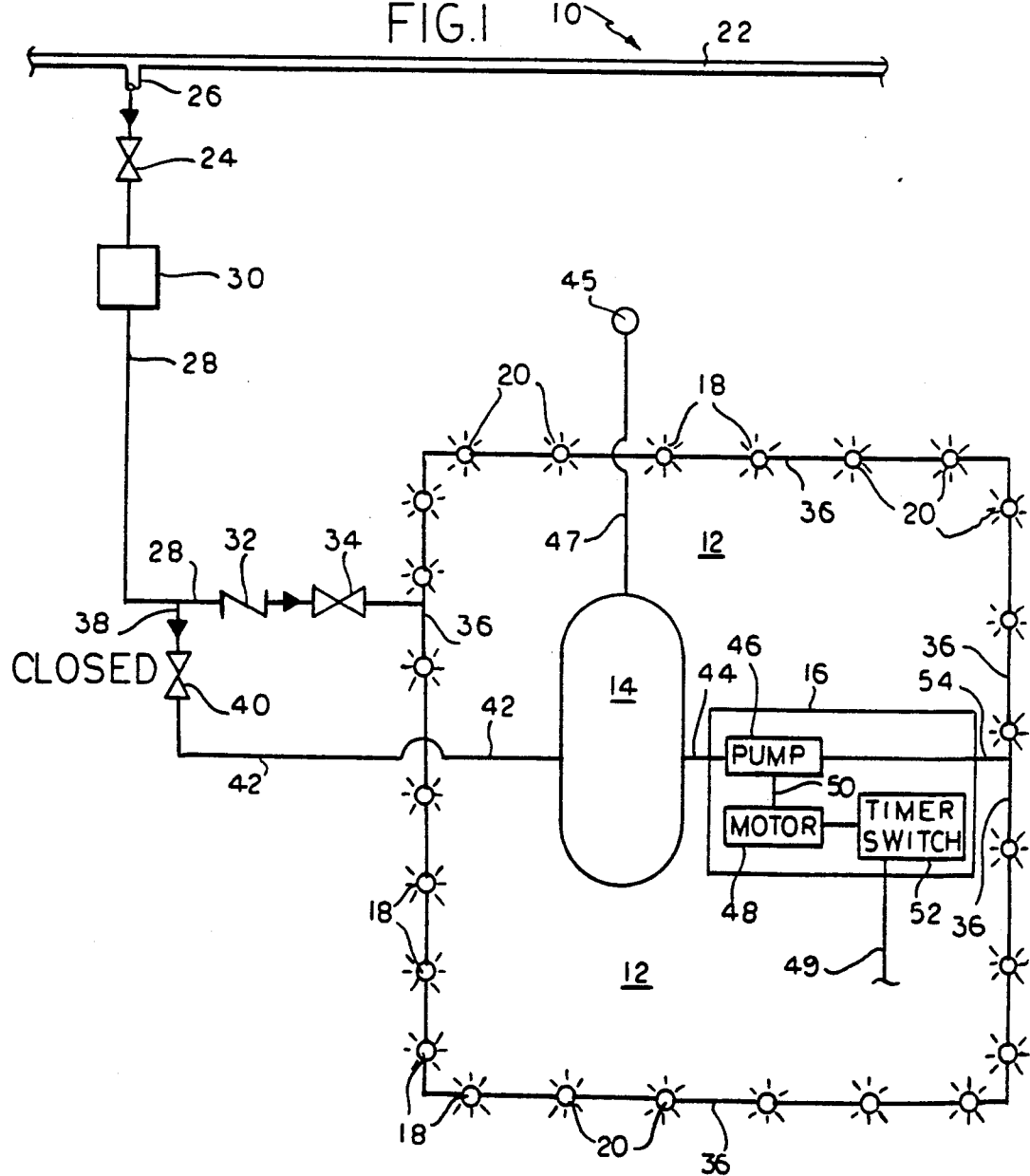
FIG. 1 is a diagrammatic view of an irrigation apparatus constructed according to the teachings of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Drawing attention to FIG. 1, a novel irrigation apparatus or system 10, constructed according to the teachings of the present invention, for supplying water to a golf course 12 or other area is illustrated in diagrammatic form. It is to be understood that, while the invention will be discussed with respect to its employment with irrigating a golf course 12, the system 10 can be effectively utilized with any area requiring irrigation, such as a farm and the like. It is also to be clearly understood that for the invention to function as described hereinbelow, an auxiliary, source of water, such as a local water utility, and an electrical power source supplying electrical power at lower rates during off-peak periods are required. Also, while the auxiliary source of water discussed herein may have a pressure different than the pressure used during major waterings, it is to be clearly understood that the invention will function as represented if the auxiliary water is provided at lower pressures, lower flow rates, or both. If these conditions are met, the system 10 should be able to supply the relevant area with water continuously, while simultaneously reducing irrigation related expenditures.

Generally, the system 10 comprises a water reservoir 14 for supplying a primary or first water source, a pumping station 16, and a plurality of sprinklers 18 arranged in an appropriate manner to supply the course 12 with an appropriate amount of water 20, shown being sprayed from the sprinklers 18. The system 10 is connected to a water supply main 22, which delivers water from a secondary water source, not shown, to the system 10. Typically, the main 22 delivers water from a local utility to the system 10 at a line pressure of approximately 50 to 60 psi.

A first gate valve 24 is connected to the main 22 by a piece of pipe 26 so that water can flow from the main 22 to the valve 24. The valve 24 is normally in an open position, thereby allowing water to flow from the main 22 through the valve 24, and through another piece of pipe 28 to the remainder of the system 10. An antisiphon vacuum breaker 30 is preferably connected to the pipe 28 adjacent the valve 24 for preventing back flow or siphoning of water through the valve 24 to the main 22.

An end of the pipe 28 opposite to the end thereof connected to the valve 24 is connected to a pressure actuated check valve 32 which permits water to flow therethrough from the pipe 28, but prohibits flow of water in the opposite direction. An end of the check valve 32 opposite to the end thereof connected to the pipe 28 is connected to a second gate valve 34. This valve 34 is also usually in an open position. An end of the valve 34 opposite to the end thereof connected to the check valve 32 is connected to a feed pipe or water main 36 to which the sprinklers 18 are connected. Thus, water is allowed to flow from the main 22, through the valve 24 and the breaker 30, through the pipe 28, the check valve 32 and the valve 34 to the sprinklers 18. This flow path supplies the sprinklers 18 with water at the utility line pressure which may, for example, be about 50 to 60 psi. While this pressure may be insufficient for major watering of the course 12, it will be sufficient to "syringe" the course 12, as will be discussed hereinbelow.

A branch water pipe 38 is connected to the pipe 28 between the breaker 30 and the check valve 32 so that water can flow both to the check valve 32 and through the branch pipe 38. An end of the branch pipe 38 opposite to the end thereof connected to the pipe 28 is connected to a third gate valve 40. The gate valve 40 is normally in a closed position, as indicated in FIG. 1, thereby preventing water flow therethrough. Thus, the valve 40 is connected in parallel with the check valve 32 and the gate valve 34.

An end of the gate valve 40 opposite to the end thereof connected to the branch pipe 38 is connected to a feeder pipe 42 so that, when the valve 40 is in an open position, water can flow from the pipe 28 through the branch 38 and the valve 40 into the feeder 42. The feeder pipe 42 empties into the reservoir 14. In this manner, a desired water level may be maintained in the reservoir 14. A well 45 may be provided, connected to the reservoir 14 by a pipe 47, also for maintaining the water level in the reservoir 14. Well water may be selectively used in place of or supplementary to water available through the utility main 22. Water is preferably pumped from the well 45 to the reservoir 14 during off-peak periods to minimize pumping costs.

Another feeder pipe 44 is connected to the reservoir 14, preferably at a location offset from the location occupied by the feeder pipe 42. An end of the feeder pipe 44 opposite to the end thereof connected to the reservoir 14 is connected to the pumping station 16. More specifically, that end of the pipe 44 is connected to a pump 46, or series of pumps, only one being shown diagrammatically in FIG. 1, for forcibly drawing water from the reservoir 14 and pressurizing said water for delivery to the sprinklers 18.

The pumping station 16 also includes a prime mover in the form of an electric motor 48, or series of motors, only one being shown diagrammatically in FIG. 1, connected to the pump 46 by a drive shaft 50 for activating the pump 46. It is to be noted that the motor 48 need not be electric in order for the invention to perform its cost-saving function as represented herein. The electric motor 48 is electrically connected, through line 49, to the electrical utility power source, not shown but described hereinbefore, having lower electrical power rates during off-peak periods, for energizing the motor 48. A timer or clock-operated switch 52 is connected in the line 49 for energizing the motor 48 during the predetermined off-peak periods while preventing energizing of the motor 48 during peak power usage periods, when the rates are higher. The pumping station 16 may also include various other apparatuses and devices of known construction, such as devices for remotely opening and closing the valves and/or the sprinklers 18, as discussed above.

The pump 46 output is connected to a feeder pipe 54 which is, in turn, connected to the feed pipe 36, as shown in FIG. 1, for carrying pressurized water from the pumping station 16 to the pipe 36. The pump 46 is capable of delivering high volumes of water and of pressurizing the water to relatively high pressures, which may be on the order of 100 psi or more. Thus, the water supplied to the sprinklers 18 through the pipe 54 is at a pressure substantially greater than the pressure of the water supplied to the sprinklers 18 through the pipe 28. This substantial increase in pressure allows the sprinklers 18 to effectively water the entire golf course 12 when the pump 46, and thereby the motor 48, operates.

With the structure of the system 10 being thusly disclosed, the method of irrigation will now be discussed in detail. It is to be noted that a greater understanding of the structure of the system 10 may be attainable with reference to the following discussion.

When the system 10 is initially connected to the water main 22, the valve 24 is closed so that water flows from the main 22 into the pipe 26, and stops at the valve 24. The water is usually provided at a relatively low line pressure of about 50 to 60 psi. The valve 24 is then opened, and water flows from the valve 24, through the breaker 30, and through the pipe 28. The valve 34 is closed initially or during maintenance of the system 10, but, after start-up, it will usually remain open. The valve 40 is opened when it is desired to deliver water to the reservoir 14, and water flows from the pipe 28, through the branch pipe 38 and the valve 40 into the pipe 42. The feeder pipe 42 empties into the reservoir 14, thereby filling the reservoir 14 to a desired level. When the reservoir 14 is at the desired level, the valve 40 is closed, as indicated in FIG. 1.

At this point, the valve 34 is opened, and will now usually remain open. Currently, the pipe 36 is empty so that a pressure differential exists across the check valve 32 because the water on one side thereof is pressurized at line pressure. The check valve 32 is forced open by the pressure differential, and water flows therefrom through the valve 34 and into the feed pipe 36 towards the sprinklers 18. The feed pipe or main 36 is filled with water, and, if the sprinklers 18, or a subset thereof, are turned on, water 20, shown in FIG. 1, will forcibly exit the turned-on sprinklers 18 under the influence of the 50 to 60 psi present in the main 36.

The course 12 can be watered in this manner during peak power rate periods, thereby saving energy costs attendant with watering because the motor 48 is not activated. Because the water is provided to the sprinklers 18 at a relatively low pressure of, for example, 50 to 60 psi, the sprinklers 18 will not be able to cover the entire course with water as they do during major watering periods, which require water to be provided at a relatively high pressure which may, for example, be 100 psi or more. However, water provided to the sprinklers 18 at 50 to 60 psi should be sufficient for frequent, intermittent, short temporal duration watering periods used, for example, to "syringe" the grass on the course 12 during daytime hours when the weather is hot and sunny. This allows the course owner to preserve the grass in proper playing condition, while minimizing irrigation expenses. Thus, water can be continuously supplied to the course 12.

When off-peak power rate periods arrive, the system 10 can perform major watering of the course 12, utilizing high pressure water. Because major watering occurs only during off-peak periods, the course owner realizes substantial cost savings related to irrigation of the course 12.

To perform major watering of the course 12, the timer 52 is preset to activate the motor 48 during the predetermined off-peak periods. The timer 52 energizes the motor 48, which activates the pump 46 by means of the drive shaft 50. The pump 46 draws water from the reservoir 14 through the pipe 44. The pump 46 then pressurizes the water to 100 psi or greater and delivers the water through the pipes 54 and 36 to the sprinklers 18. Due to the increased water pressure, the sprinklers 18 are able to water the entire golf course 12.

When the highly pressurized water enters the pipe 36, the water everywhere in the pipe or main 36 becomes pressurized to substantially the same degree. This relatively high pressure encounters the check valve 32, if the valve 34 is open thereby forcing the check valve 34 to close. Thus, no water flows through the check valve 32 when the pipe 36 is pressurized to a pressure greater than the line pressure present in the main 22, and thereby the pipe 28. As the pump 46 draws water from the reservoir 14, the water level therein decreases. In order to replenish this water level, the valve 40, which is normally closed, may be opened, thereby allowing water to flow therethrough, through the feeder pipe 42, and into the reservoir 14. Alternatively, a pump for the well 45 may be activated. This well pump is also preferably activated during the off-peak periods. In this manner, the desired water level is maintained in the reservoir 14.

When the off-peak period ends, major watering should cease if the course owner wishes to minimize his expenses. Thus, the timer 52 is preset to shut off the motor 48, thereby deactivating the pump 46. The valve 40 may be kept open as long as necessary to fill the reservoir 14 to the desired level. Once this level has been achieved, the valve 40 is closed, and water flow into the reservoir 14 ceases.

When the pump 46 ceases operation, limited watering may still be obtained from the auxiliary water supply. One or more of the sprinklers 18 are opened. When this occurs, the line pressure present at the check valve 32 will cause the valve 32 to open, and the sprinklers 18 will water the course 12 in the above-discussed fashion with water supplied at the line pressure.

The present invention provides an apparatus or system for and a method of watering or irrigating an area which can provide power cost savings to a system operator. Specifically, the system provides high pressure water to the area only during periods of relatively low energy costs, and auxiliary, low pressure water, supplied from a different source not requiring on-site electric power, during peak energy cost periods. The auxiliary water source can be provided either at lower pressures, lower water flow rates, or both. It has been determined empirically by experiment that utilization of the system and method of the present invention, during a typical six-month operation season, can result in an energy cost savings of approximately $8,000.00.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. An irrigation system for irrigating an area comprising: a pipe for delivering water to the area to be irrigated; a pump connected to the pipe for delivering a first water supply from a reservoir to the pipe; a timer operatively associated with the pump for activating said pump during a first predetermined time period; a second water supply connectable to the pipe during a second predetermined time period when the pump is deactivated; a first valve; and the second water supply being connectable to the reservoir through the first valve for maintaining water in the reservoir.

2. An irrigation system for irrigating an area comprising: a pipe for delivering water to the area to be irrigated; a pump connected to the pipe for delivering a first water supply to the pipe; a timer operatively associated with the pump for activating said pump during a first predetermined time period; a second water supply connectable to the pipe during a second predetermined time period when the pump is deactivated; a check valve; the check valve connecting the second water supply to the pipe; and the check valve preventing flow of first water supply into the second water supply during the first predetermined time period, and permitting flow of the second water supply into the pipe during the second predetermined time period; and a valve connected between the check valve and the pipe for regulating water flow to and from the pipe.

3. An irrigation system for irrigating an area comprising: a pipe for delivering water to the area to be irrigated; a pump connected to the pipe for delivering a first water supply to the pipe; a timer operatively associated with the pump for activating said pump during a first predetermined time period; a second water supply connectable to the pipe during a second predetermined time period when the pump is deactivated; a check valve; the check valve connecting the second water supply to the pipe and preventing flow of the first water supply into the second water supply during the first predetermined time period, and permitting flow of the second water supply into the pipe during the second predetermined time period; and a valve connected between the second water supply and the check valve; and the valve being connected to the first water supply for providing water from the second water supply to the first water supply.

4. An irrigation system for irrigating an area comprising: a pipe for delivering water to the area to be irrigated; a pump connected to the pipe for delivering a first water supply to the pipe; a timer operatively associated with the pump for activating said pump during a first predetermined time period; a second water supply connectable to the pipe during a second predetermined time period when the pump is deactivated; a check valve; the check valve connecting the second water supply to the pipe and preventing flow of the first water supply into the second water supply during the first predetermined time period, and permitting flow of the second water supply into the pipe during the second predetermined time period; and a valve connected between the second water supply and the check valve for regulating flow of water from the second water supply to the check valve.

5. An irrigation system as defined in claim 4 further comprising an anti-siphon vacuum breaker connected between the valve and the check valve.

6. An irrigation system comprising: means including a water main for delivering water to an area to be irrigated; pump means including an energy driven prime mover connectable with a source of energy for delivering a primary supply of water to said main; means connected with said prime mover for preventing delivery of energy thereto during selected time periods; and means connected with said main for delivering an auxiliary supply of water to the main during said selected time periods when said prime mover is disconnected from the energy source; and means for preventing reverse flow of water from said water main to said last-named means when said prime mover is connected to said energy source, said means for delivering an auxiliary supply of water comprising a pressure-activated check valve connected between the auxiliary supply and the water main.

7. A method for irrigating an area comprising the steps of: providing a water delivering main associated with the area for irrigating the area; delivering water at a first pressure from a primary supply to said main during a first predetermined time period; preventing delivery of the primary water to said main during a second different time period; delivering water at a second pressure substantially lower than said first pressure from an auxiliary supply to said main during said second time period; utilizing an energy driven means for delivering said primary water; connecting said means to a source of energy having a first low cost during said first predetermined time period, and a second high cost during said second predetermined time period; and preventing operation of said means during said second predetermined time period.

* * * * *